United States Patent
Lawaetz.Veilberg

[11] Patent Number: 6,145,408
[45] Date of Patent: Nov. 14, 2000

[54] MECHANISM FOR FEATURE IMPROVEMENT FOR BICYCLES AND OTHER CRANKDRIVEN MECHANISM

[76] Inventor: Steen Uffe Lawaetz.Veilberg, Galten 8464, Herskind, Denmark

[21] Appl. No.: 08/617,796
[22] PCT Filed: Sep. 5, 1994
[86] PCT No.: PCT/DK94/00333
 § 371 Date: Mar. 7, 1996
 § 102(e) Date: Mar. 7, 1996
[87] PCT Pub. No.: WO95/07421
 PCT Pub. Date: Mar. 16, 1995

[30] Foreign Application Priority Data

Sep. 6, 1993 [DK] Denmark ................... 1002/93

[51] Int. Cl.[7] .................................................. B62M 1/06
[52] U.S. Cl. ........................ 74/594.2; 74/63; 464/106
[58] Field of Search .................. 74/63, 594.2, 594.1; 464/106, 112, 125

[56] References Cited

U.S. PATENT DOCUMENTS

| | | | |
|---|---|---|---|
| 668,873 | 2/1901 | Dickinson | 74/63 X |
| 1,035,654 | 8/1912 | Swanson | 464/112 |
| 1,783,758 | 12/1930 | Weiss | 74/63 |
| 2,020,123 | 11/1935 | Pollard | 74/63 |
| 3,030,784 | 4/1962 | Minik | 464/125 |
| 3,456,458 | 7/1969 | Dixon | 464/125 X |
| 3,475,976 | 11/1969 | Steinke | 74/63 |
| 4,697,469 | 10/1987 | Takamiya et al. | 74/63 X |
| 4,712,450 | 12/1987 | Takamiya et al. | 74/63 X |

FOREIGN PATENT DOCUMENTS

| | | | |
|---|---|---|---|
| 988829 | 8/1951 | France | 74/63 |
| 24 53 084 | 5/1976 | Germany | 464/125 |

*Primary Examiner*—Mary Ann Battista

[57] ABSTRACT

In the case of bicycles, the purpose of the new construction is to make maximum use of the momentum produced by pedalling under varying ground conditions, load, and acceleration—thus making bicycling easier. The construction has two variable positions which reduce the time during which the pedals are in a dead position (top and bottom) and prolong the time where the pedals are at right angles (16) whereby maximum effect is gained from the power force. This applies if the direction of force is non-circular, i.e. when there is a rise of the ground, and under acceleration as well as "standing pedalling". New positioning is possible in relation to the pedal arm (18), i.e. when changed ground conditions (rise) cause the center of gravity (pedalling) to shift. The invention differs from existing ones in that there is "increased" angular velocity between the driving shaft (1) and driven shaft (2) when they are on the same level and have the same longitudinal direction, which is the case in this construction. Also, the special suspension obtained by means of three moving rings (3) (4) (5) (like cardan suspension) of which the change of angle and vertical position (4) of the second ring together with the manually controllable parts (16) (18) produce the above-mentioned increased angular velocity and its position in relation to a given center of gravity. (9) shows an exterior bearing.

11 Claims, 15 Drawing Sheets

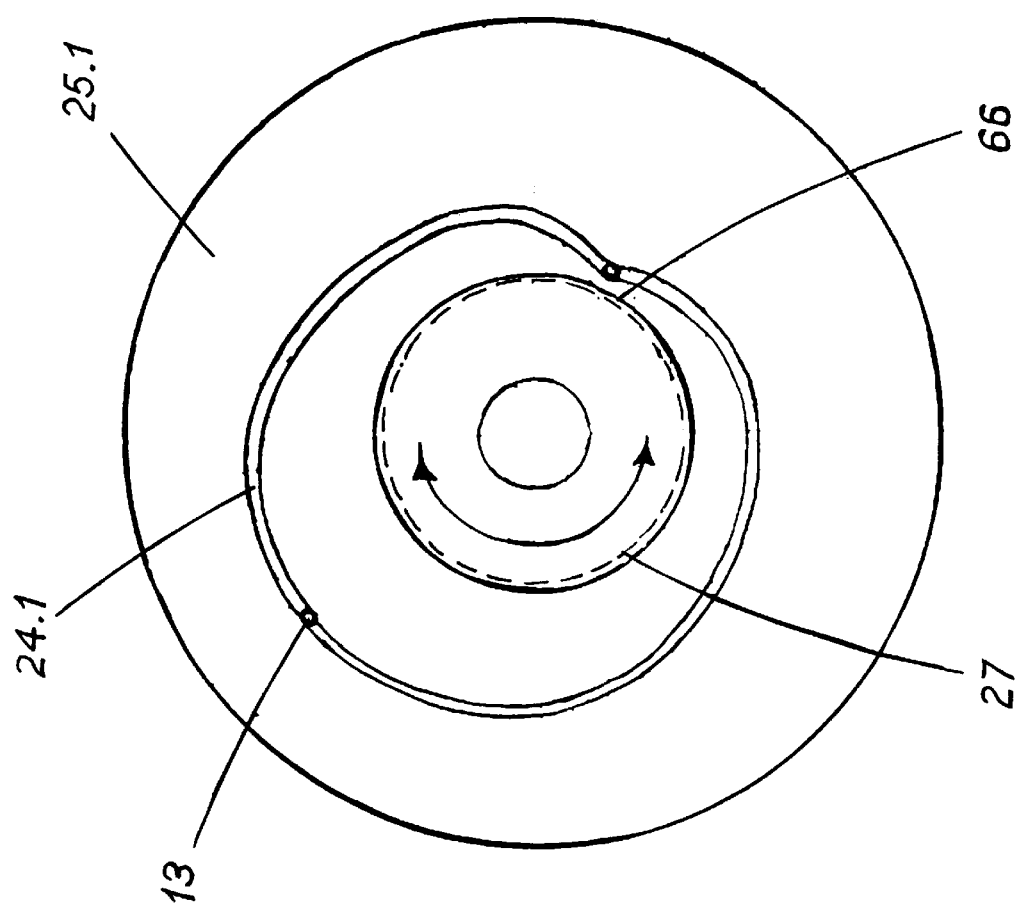
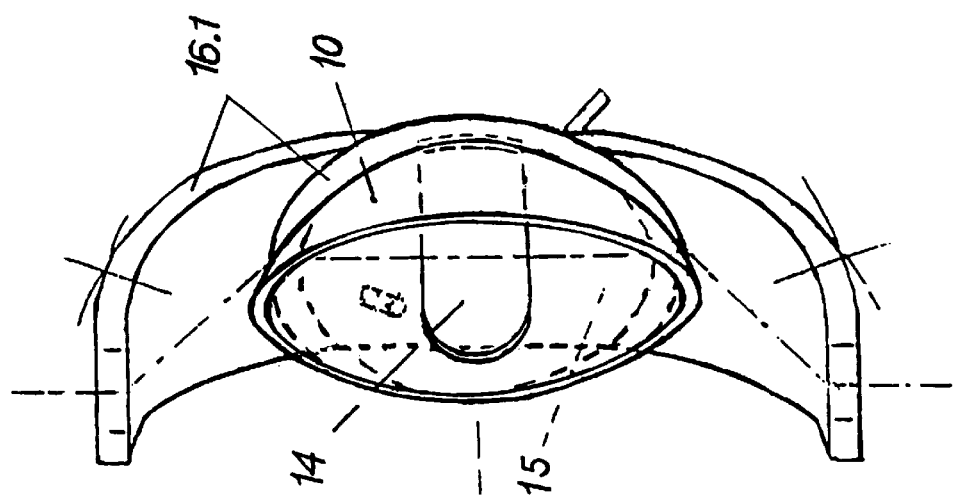

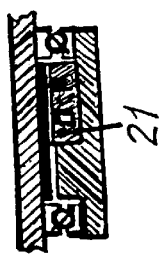
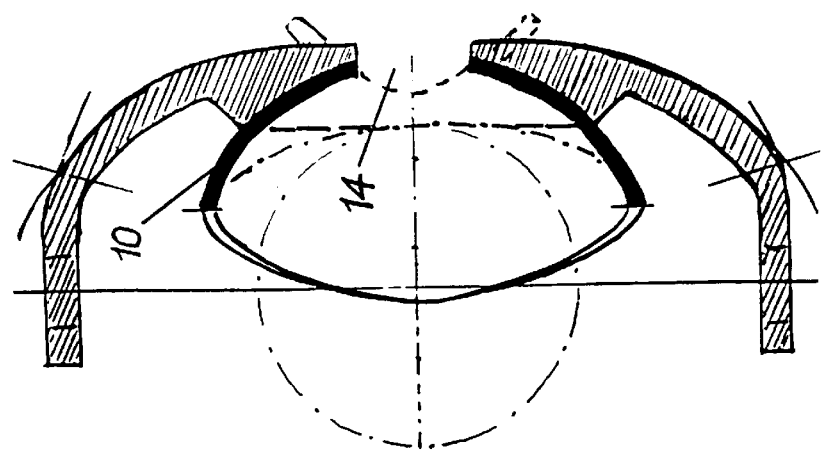
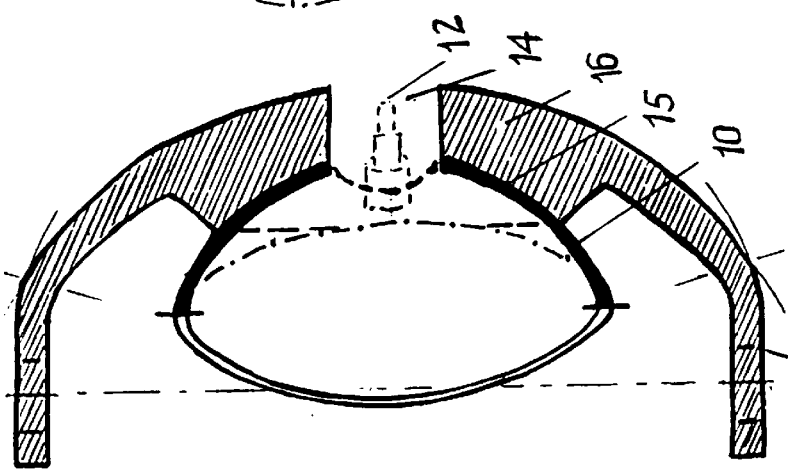

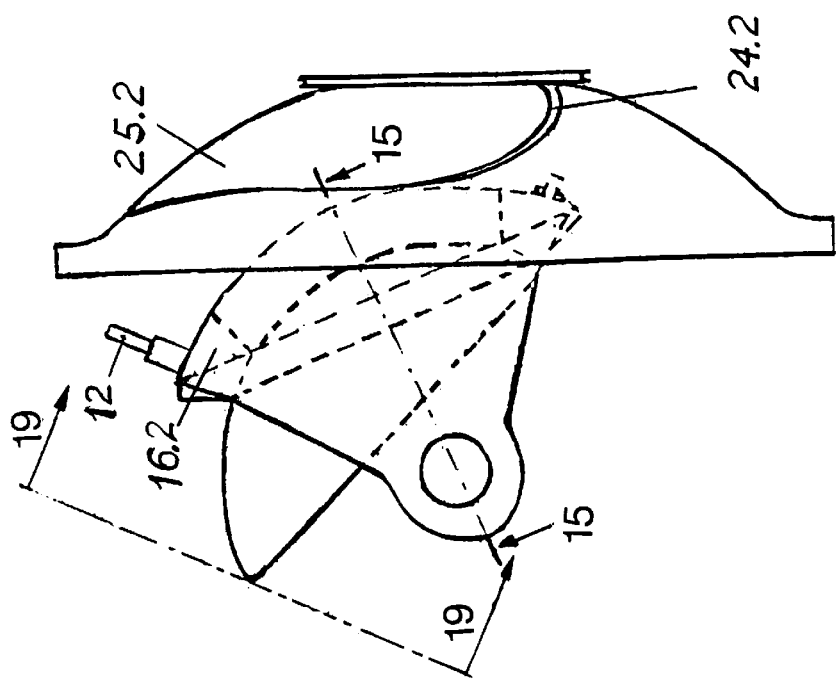
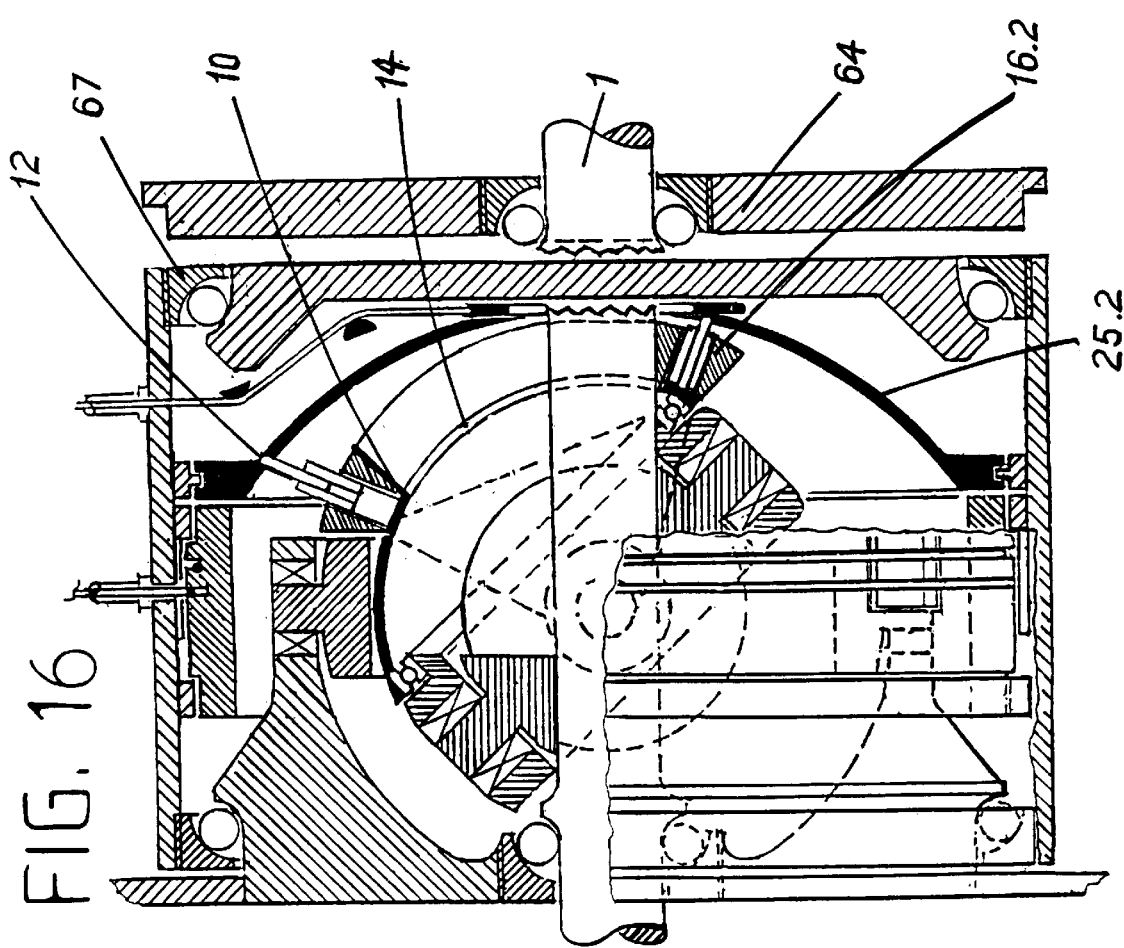

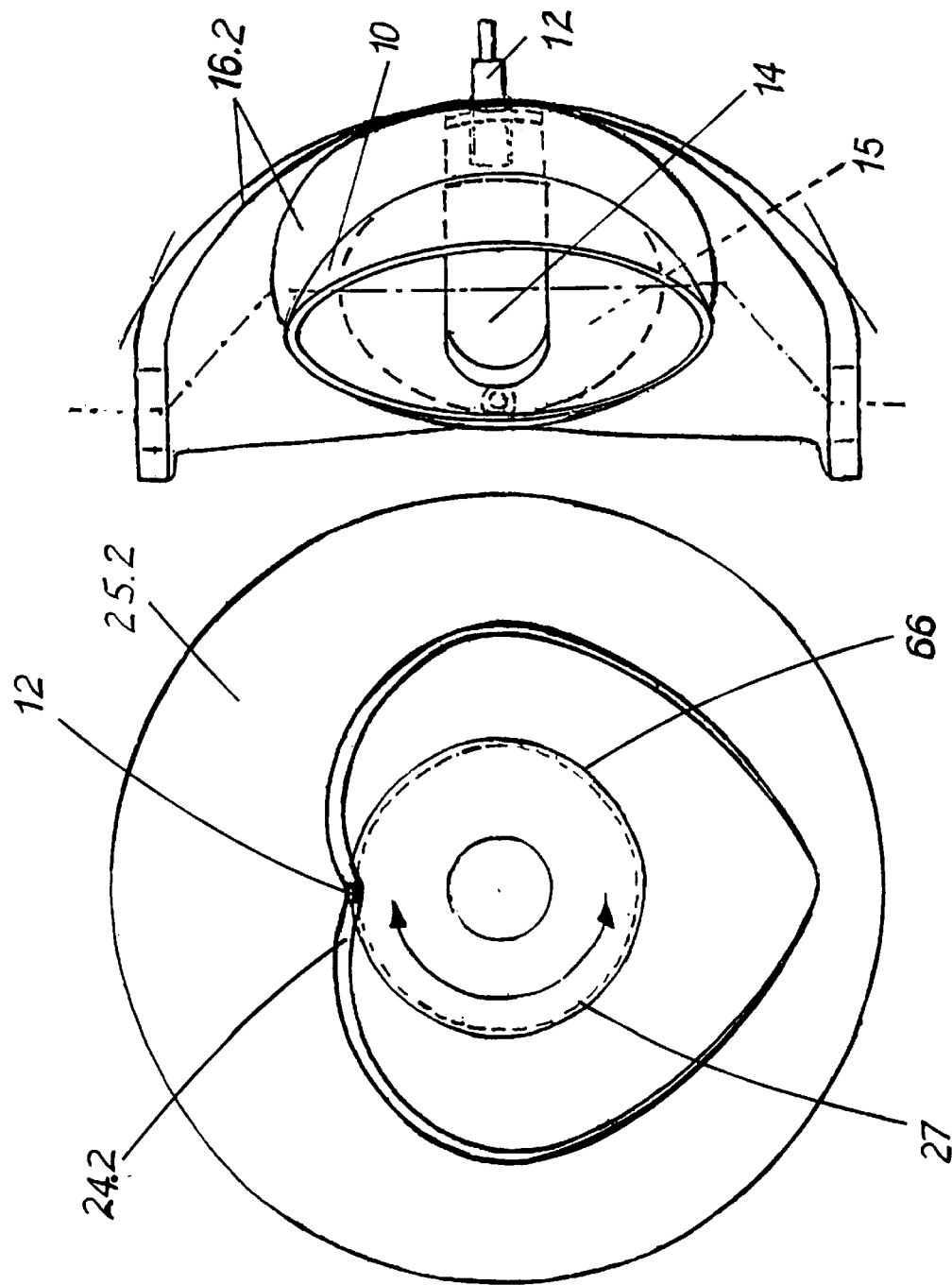

FIG. 24
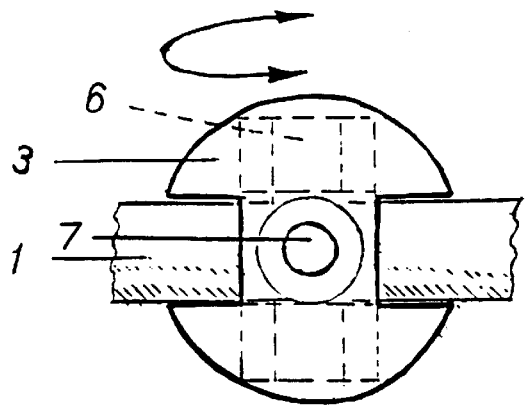
FIG. 25
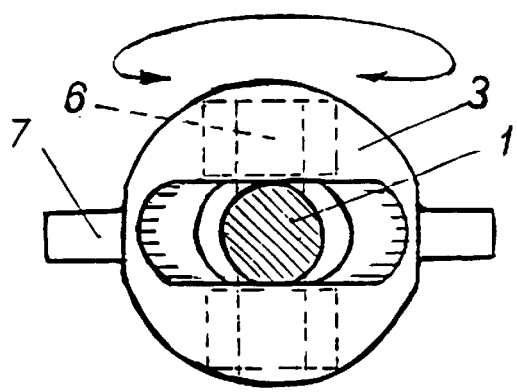
FIG. 26
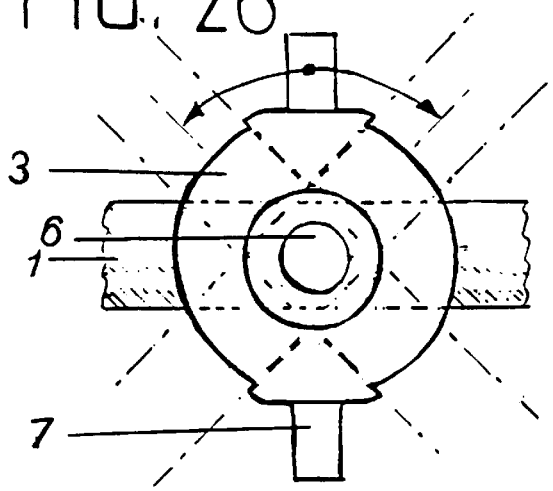
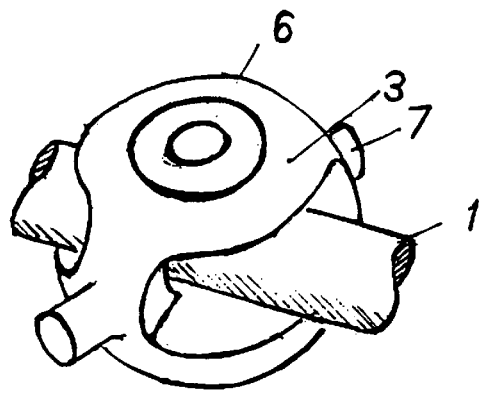
FIG. 27
FIG. 28
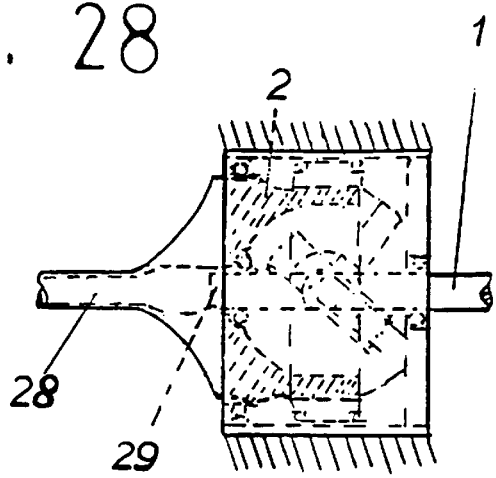

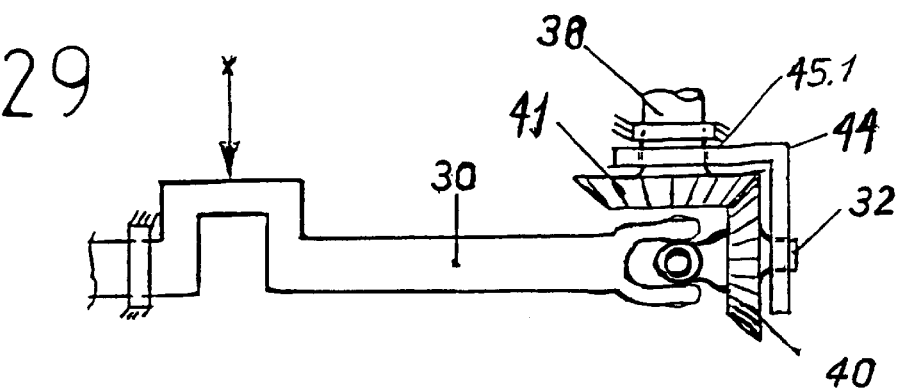
FIG. 29
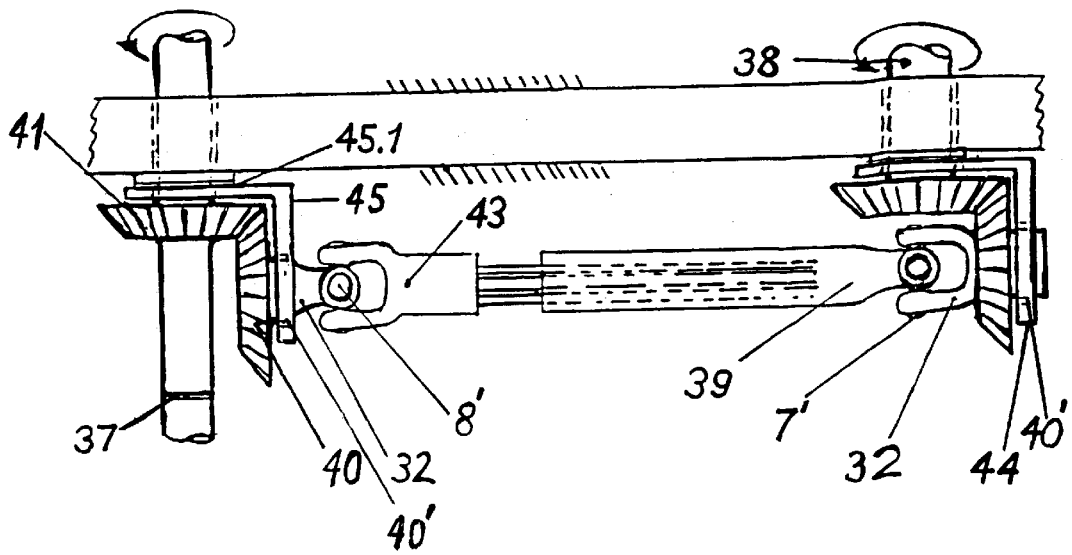
FIG. 30
FIG. 31
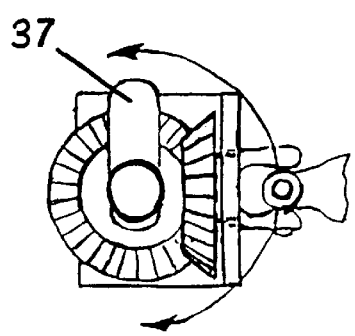
FIG. 32
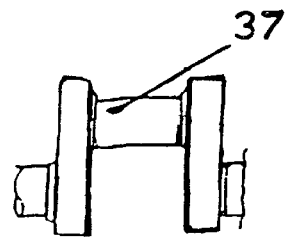

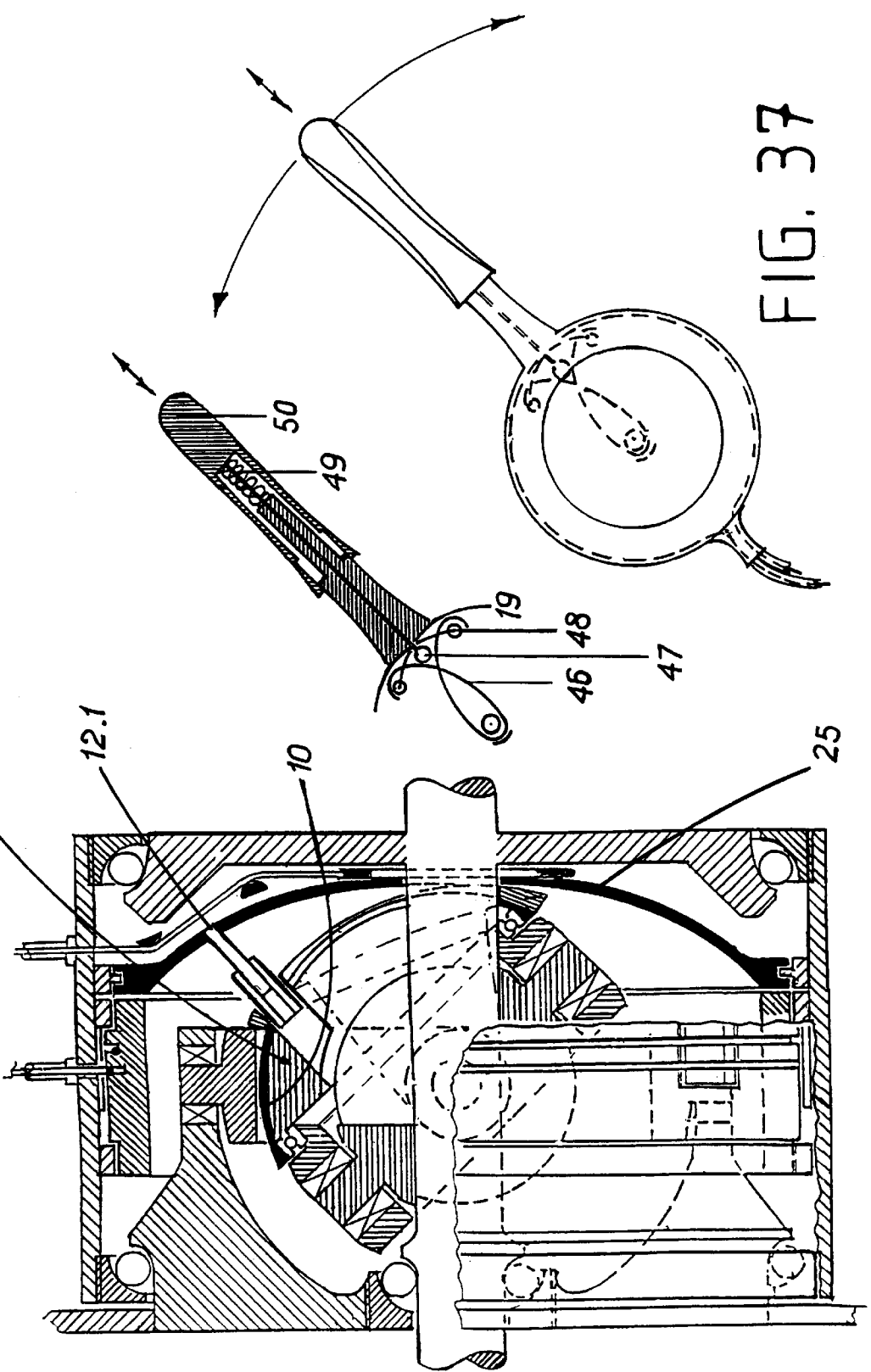

MECHANISM FOR FEATURE IMPROVEMENT FOR BICYCLES AND OTHER CRANKDRIVEN MECHANISM

BACKGROUND OF THE INVENTION

The invention concerns a mechanism with an ingoing and an outgoing shaft for transforming a rotation with constant angular velocity to a rotation with periodically varying angular velocity. In the prior art is known a mechanism of this sort with an ingoing shaft, a universal joint no. one with pivots, a ringshaped middle part, which is firmly combined with the pivot, a universal joint no. two with pivots and an outgoing shaft, the ringshaped middle part has only one pivot for the first and the second universal joint, and so there is not achieved a summation of the angular velocity amplitudes which can arise in the single joints, when they are adjusted to an angular deflection, by the ringshaped middlepart being tilted round a diameter, which is at right angles to the ingoing and the outgoing shaft, this mechanism achieves a periodically varying angular velocity by the pivots of the second universal joint having an angle between them, differing from 90°.

Another mechanism is known in the prior art having coaxial ingoing and outgoing shafts, two universal joints connected in series, wherein the output of one universal joint is an adjustable middle part which is the input of the other universal joint, wherein the one universal joint is connected with the ingoing shaft via a fixed component in form of an arch with pivots or bearings for pivots on its extremities as the ingoing shaft goes through the outgoing shaft which is hollow and carries the ingoing shaft whereby both the ingoing and the outgoing shaft go through the swingable adjustable middle part, which means that the swingable adjustment by the middle part is substantially limited because both the ingoing and the outgoing shaft go through said middle part.

Another mechanism for transforming a rotation with constant angular velocity to a rotation with varying angular velocity consists of chaindrive with an oval sprocket wheel. This mechanism is used for bicycles in order to pass quickly the pedal positions, which give a bad moment of the pedalcrank. It has the disadvantage that you can neither adjust the amplitude, nor the phase of the angular velocity.

SUMMARY OF THE INVENTION

By means comprising of middle part pivots for each of the two universal joints connected in series having their axes at right angles to one another, there is achieved a summation of the angular velocity amplitudes of the universal joints, in the outgoing shaft, as it is also known, when the middle part is a shaft with universal joints connected in series in each end, when the pivots in each end of the shaft are at right angles to one another.

The ingoing shaft is supplied with connecting means comprising of a pair of traversing radially directed pivots for engaging into a surrounding ring. It can go through if the other pivots of the universal joints are radially placed on rings that surround one another, so that the outgoing shaft is identical with the outermost ring.

The pivots can with advantage be at right angles to one another, as is normal in universal joints.

The ringshaped middle part (4), which can be swung (tilted) round an axis, at right angles to the ingoing shaft, can, with advantage, also be suspended turnably around the very axis of the ingoing shaft, the amplitude phase then being adjustable.

The ringshaped middle part is, as mentioned, connected to a non-rotating, but swingable part, whose tilting decides the amplitude. This swingable part is provided with actuating means which may include a segment of a sphere with a groove, that gives space for the ingoing shaft, during the swinging, (adjustment).

The swinging may be controlled via radially directed pivots in connection with the sphere-segment.

The pivots can engage in a roller-path in a rotatable ball-sector, whose rotation to a location-position decides the swing. The swing movement, which controls the amplitude, can take place around bearings, whose axes are situated on the diameter of an outer ring, concentric with the ingoing shaft.

By rotation of this outer ring, the phase of the amplitude can be adjusted.

With advantage, the mechanism may be used in a bicycle crank, so that the ingoing shaft has pedal-cranks on it, which will have periodically varying angular velocity, so that they pass quickly the top and bottom positions with a short moment of the pedalcrank.

In return, the pedals will then be for a longer period of time in positions with a long moment of pedalcrank.

The mechanism may also be carried out with an outgoing shaft, which is in extension of the ingoing shaft, as the ringshaped outgoing shaft can be extended to a solid shaft, when the ingoing shaft only protrudes from the mechanism to one side.

The mechanism can also be applied to bicycles with cardan-drive, as the joint-part, mentioned in the claims as middlepart (4) can be prolonged in axial direction, which brings the two universal joints to be in extension of one another, and the in- and outgoing shaft to lie parallel opposite one another, engaging by connecting means comprising bevel gears at right angles to respectively the ingoing and outgoing joint (32) for the two universal joints; the fixed component (44) mentioned in the claims as a bearing housing which part is swingable around the axes of the ingoing and outgoing shafts by which means a given amplitude phase may be adjusted; profitably four engaging bevel gears can be used. The mechanism can also be carried out by the use of balls (55) in roller-paths instead of universal joints in bearings. The mechanism may, with advantage, be used in connection with a crankshaft and also with a single universal joint and with an ingoing and an outgoing shaft at right angles to one another.

BRIEF DESCRIPTION OF THE DRAWINGS

FIGS. 6–8 and 14: Shows details of parts in FIG. 5.

FIG. 11: Is a sectional view taken along a line 11—11 in FIG. 10.

FIG. 12 : Is a sectional view taken along a line 12—12 in FIG. 10.

FIG. 13: Shows a sectional view taken along a line 13—13 in FIG. 9, as viewed in a direction shown by arrows.

FIG. 15: Shows a sectional view taken along a line 15—15 in FIG. 17.

FIG. 16: Shows an altered construction of the mechanism with telescopic steering pivots.

FIGS. 17, 18, 19: Shows details of parts in FIG. 16.

FIGS. 24–27: Shows the shaft (1) with the ring (3).

FIG. 28: Shows a special form of construction, where the drive-shaft (1) and the driven shaft (28) are in extension of one another.

FIG. 29: Shows a possible simplified application with a universal joint and with the ingoing and outgoing shafts at right angles.

FIG. 30: Shows a device with a universal shaft-drive, and the ingoing and outgoing shafts lying parallel opposite one another and an intermediate part, which is prolonged in an axial extension.

FIG. 31: Is a side view of parts in FIG. 31.

FIG. 32: Is a front view of a detail in FIG. 30.

FIG. 36 Shows an altered construction of the mechanism with only one telescopic steering pivot.

FIG. 37 Is a front view of the handle in FIG. 37.A.

FIG. 37.A Shows a handle for controlling the phase of the angular velocity-amplitude by turning of an outer ring by wiredrive.

DESCRIPTION OF THE PREFERRED EMBODIMENT

FIG. 1

Figure 2:
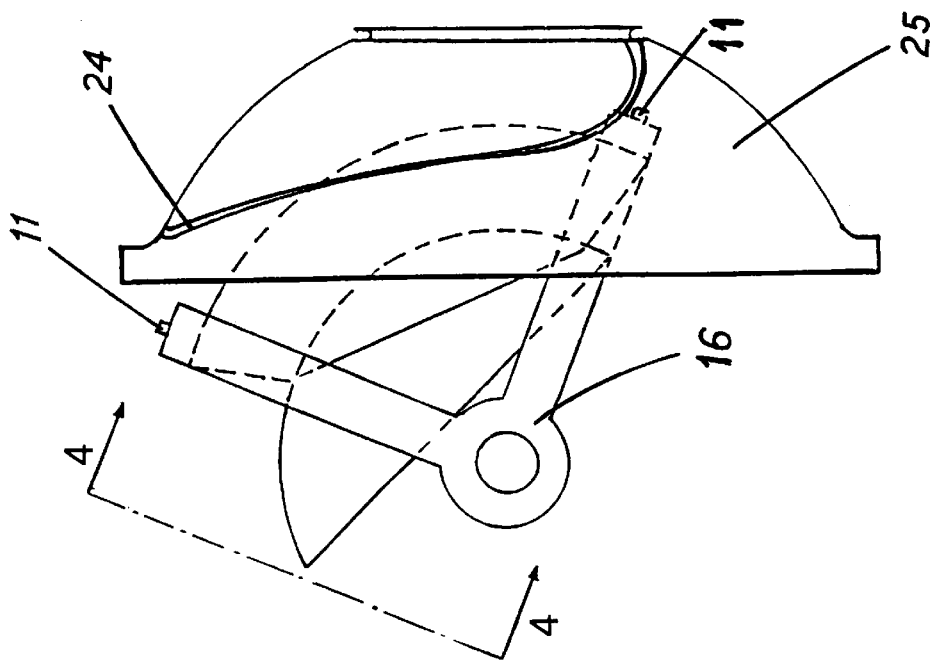
FIGS. 2–4: Shows specific details of parts in FIG. 1.

Shows a cross-section through the mechanism, mounted in the crankhousing of a bicycle. The figure is aimed to be shown on a scale of 1:1. The drive shaft—the crank (1) mentioned in the claims as the ingoing shaft (1) has, placed opposite and at right angles to it, pivots (6) bedded in bearings in a surrounding spherical ring (3), mentioned in the claims as a surrounding ring. In the ring, 90° from the bearings, there are placed two diametrically opposite pivots (7), mentioned in the claims as pivots of the surrounding ring (3), which are also bedded in bearings in an outer ring (4), being the variably adjustable part, mentioned in the claims as a middle part (4). The ring (4) also has two diametrically opposite pivots (8), mentioned in the claims as pivots of the middle part, placed 90° from the bearings of the pivots (7). The pivots (8) are bedded in bearings in an outer ring (5), mentioned in the claims as an additional surrounding ring, which has, staggered 90° from the bearings of the pivots (8), two diametrically opposite pivots (5'), which are bedded in an outer cylindrical ring (2), being also the driven shaft, mentioned in the claims as the outgoing shaft, with the sprocket wheel, in which the shaft (1), the crankshaft is bedded co-axially in a bearing (62). The ring (2) is suspended in an outer bearing (63), which is placed in the inner wall of the crankhousing (23). The drive shaft (1) is, at the opposite end of the shaft, where it goes through the end wall of the crankhousing (64), bedded in a bearing (65) herein, the mentioned ring (4) has along the edge of the circumference, an outer bearing (9), which, placed within a part, shaped as a domeshell (10), shaped as a segment of a sphere, causes the ring (4) to be able to rotate in the domeshell, which has in addition an open groove (14), allowing it to tilt/turn around an axis of bearings (17), at right angles to the shaft (1) and thereby change its angular position compared to it.

The domeshell (10) is able to turn/tilt by being fastened (15) to a controlpart (16), protruding from the outside of the domeshell and stretching out round the rings (2) and (5), and being placed, by diametrically opposite bearings (17), in an adjustable outer ring (18). The part (16), consisting of two semicircular bifurcations, has, placed on the middle of the two arcs of circle, two pivots (11), which engage in an rollerpath (24) in an outer shell-mould shaped as a ball-sector (25), which, along the edge of the hole circumference, is suspended in a bearing (26). A turn around the ball-sectors (25) own axis by wiredrive (27) in a roller-path (66), will guide the domeshell (10)—by pivots (11) in a roller-path (24)—to tilting/changing its angular position, and because of the cohesion of the ring (4) and the domeshell (10) by a bearing, a change of angle takes place between the rings (3), (4), (5) by which means the angular velocity of the shaft (1) will vary periodically, when the ring (2) has a constant angular velocity.

The adjustable outer ring (18), in which the part (16) is bedded in pivots (17), can be turned around its axis along with the part (16) whereby the phase of the periodical angular velocity can be changed.

FIG. 2

Shows the part (16) and the ball-sector (25), partly separated.

FIG. 3

Shows the rollerpath (24) in the ball-sector (25), and the rollerpath (66) mounted on it, for wiredrive (27) for the turning of the ball-sector (25).

FIG. 4

Showing a sectional view 4—4 in FIG. 2 of the part (16); the groove opening (14) for the ingoing shaft to go through can be seen.

FIG. 5

Figure 1:
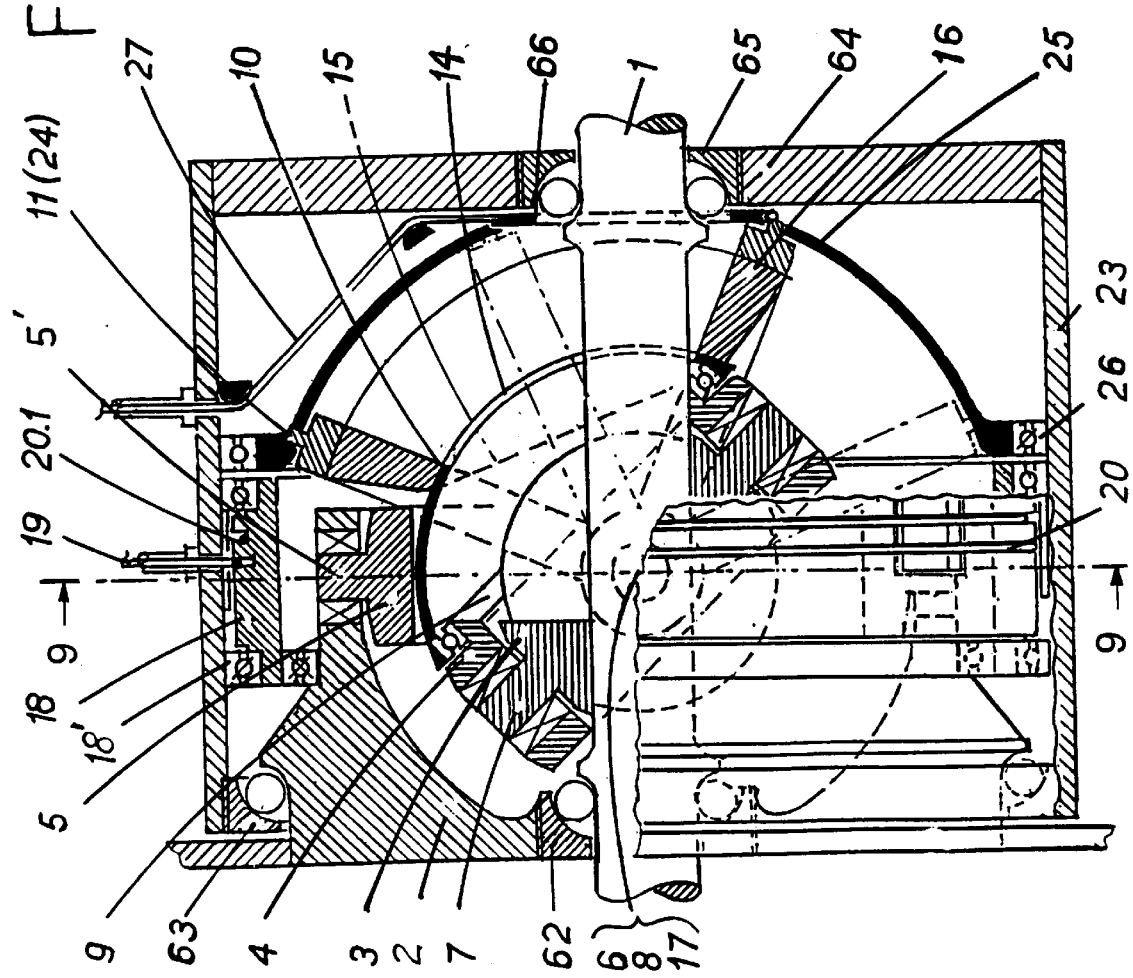
FIG. 1: Shows a cross-section through the mechanism, used here in a bicycle crank.
Figure 4:
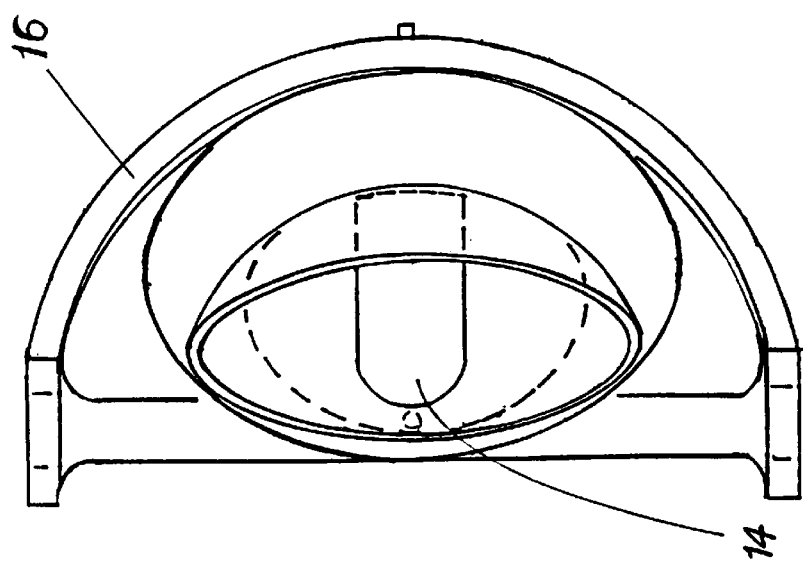
Figure 3:
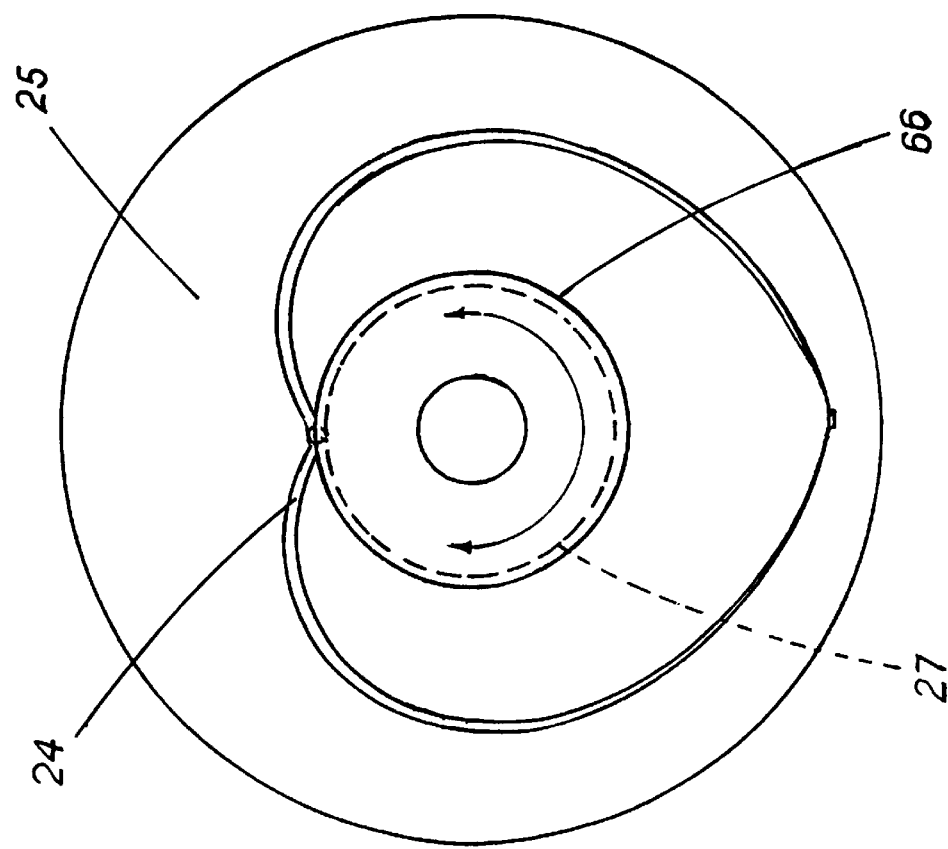

Apart from the changes mentioned below, shows the same as appears in FIG. 1. If a smaller width of the crank is desired, the axial extension of the ball-sector (25.1) is reduced. The pivots (13), same as (11) in FIG. 1, are, on account of the groove (14), displaced compared to the middle of the arcs of circle, where they are placed on the control part (16.1), which is reduced and altered compared to the control part (16) in FIG. 1. The bearing (65) of the crankshaft (1) is replaced by a bearing (67), bedded in the innerwall of the crankhousing (23.1).

FIG. 6

Figure 5:
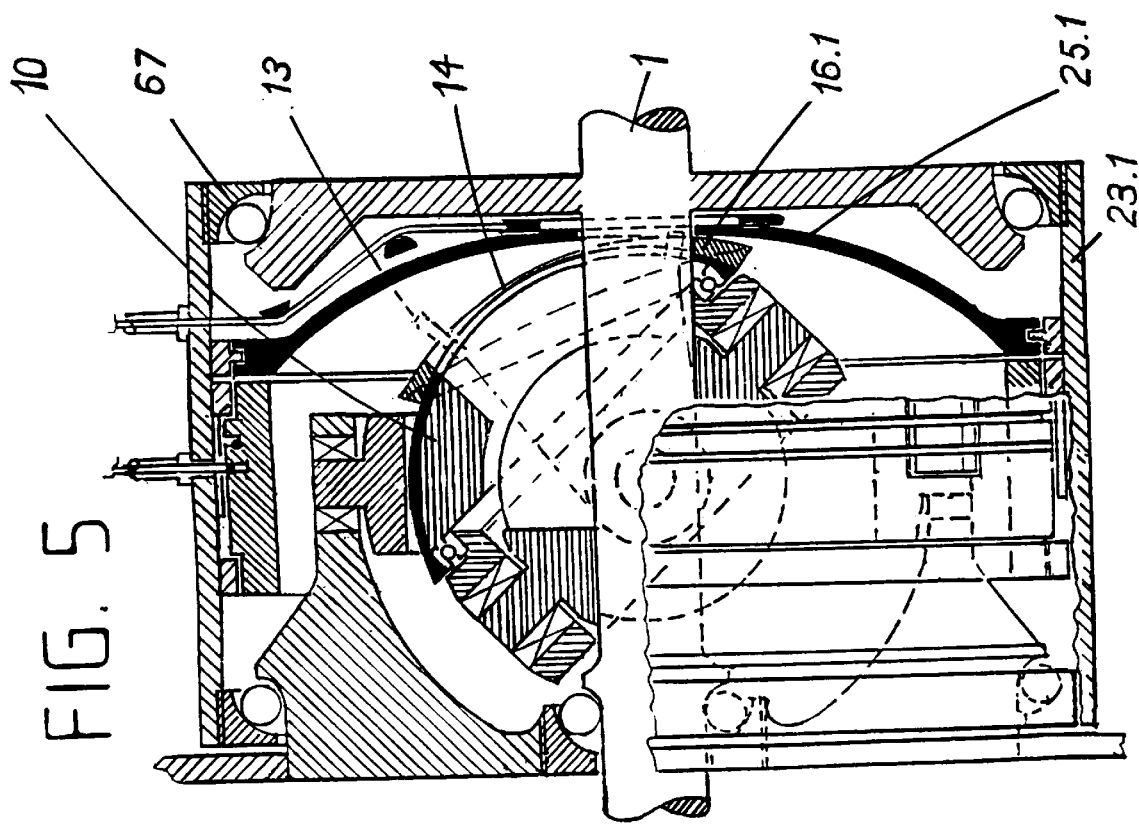
FIG. 5: Shows an altered form of construction of the mechanism.

Shows specific details of parts from FIG. 5, respectively the development of the pivots (13) and their position in the ball-sector (25.1), as well as their rollerpath (24.1) in the ball-sector. The parts have been taken apart axially.

FIG. 7

Figure 6:
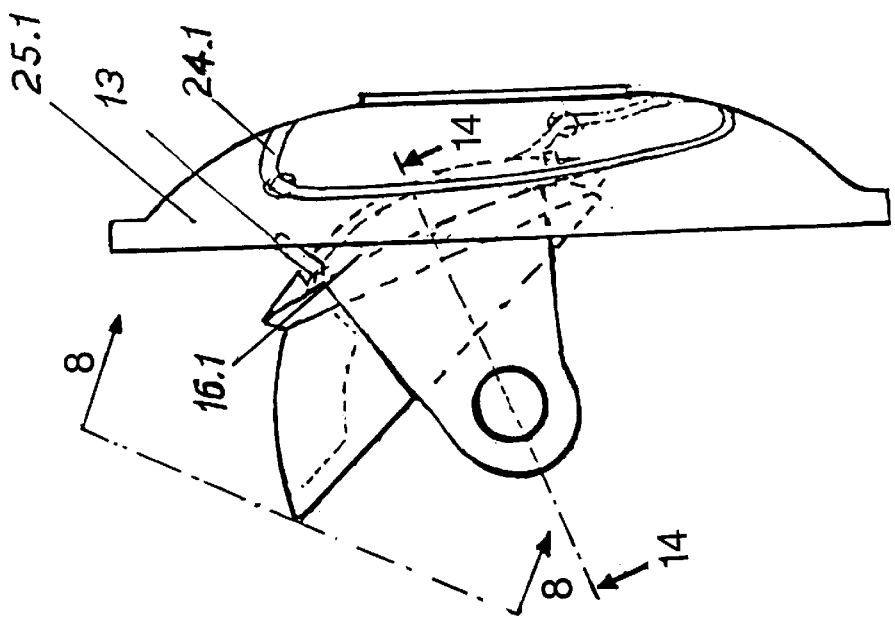

Shows specific details of parts from FIG. 5 and FIG. 6, respectively the rollerpath (24.1) of the pivots (13), and the mounted rollerpath (66) for wiredrive (27) for the turn of the ball-sector (25.1).

FIG. 8

Figure 23:
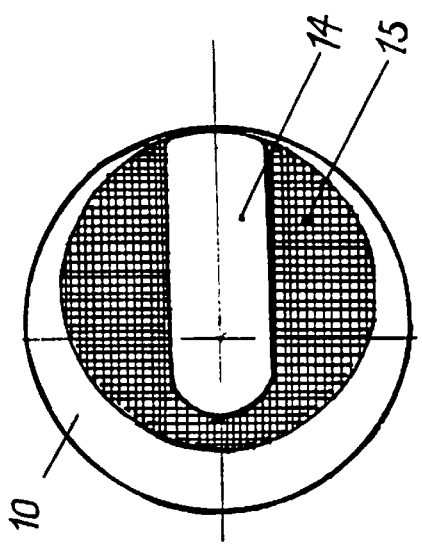
FIGS. 22–23: Shows a sectional view in FIG. 21.

Shows a sectional view 8—8 of FIG. 6 without the ball-sector (25.1). The groove opening (14) for the ingoing shaft to go through can be seen. The controlpart (16.1), protruding from the top of the domeshell (10) is to be seen, as well as its fastening area (15) on the domeshell, shown in hidden outline, can be seen in FIGS. 21, 22, 23.

FIG. 14

Shows a sectional view 14—14 of FIG. 6. The hatched area within the domeshell (10), which can be seen in FIG. 5, is not drawn in the sectional view, as the solid area is not necessarily needed, (14) shows the open groove through the domeshell (10) for the ingoing shaft to go through.

FIG. 15

Shows a sectional view 15—15 of FIG. 17. The open groove (14) through the domeshell (10) is seen, as well as the fastening area (15) for the protruding control part (16).

FIG. 9

Shows a sectional view 9—9 of FIG. 1, as it will appear, if the rings (3), (4) and (5) are turned, so that their centre planes are coaxial And are at right angles to the shaft (1).

The control part (16) is suspended in bearings (17) on an outer ring (18), concentric with the ingoing shaft (1).

The bearings (17) have their mutual axis on a diameter of the ring (18). The ring can be turned by a wiredrive and hereby the amplitude phase for the angular velocity is changed. In order to be able to make a turn, the pawls (21)—which hold the ring in proportion to the housing (23) by gearing into longitudinally directed teeth in the housing—must be released. This takes place by drawing a wire (19) fastened to a spring-ring (20), which runs through the pawls in a groove and through a groove, going round on the outside of the outer ring (18).

Next to this groove, another groove with less depth runs through the pawls and on the outside of the ring (18).

The two grooves have a different bottom rake of the pawls, and the last mentioned groove contains a spring ring (20.1) causing the pawls to engage. There are pawls (21) and (21'), which keep the ring (18) from rotation in either direction.

FIG. 10

Figure 9:
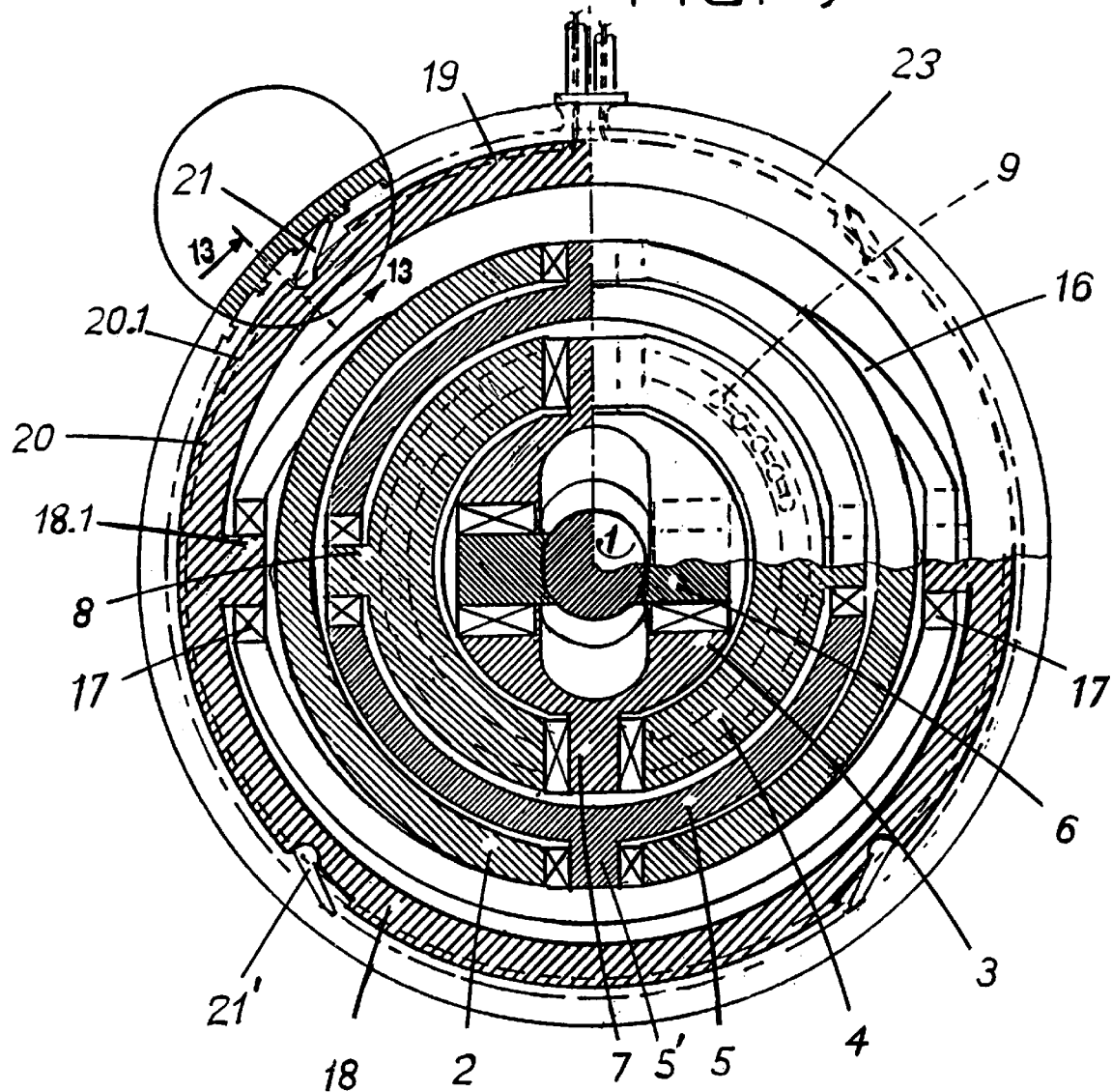
FIG. 9: Shows a sectional view taken along a line 9—9 in FIG. 1, as it will appear, when the ingoing rings are on the same level and the angular velocity amplitude is zero.
Figure 10:
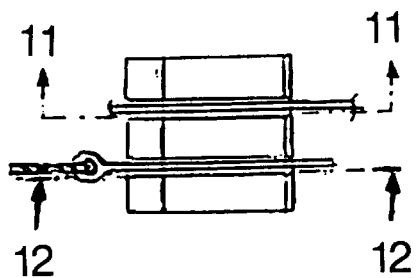
FIG. 10: Is an enlarged view of a pawl in FIG. 9, viewed radially from the outside.

In the middle of the circular cross-section in FIG. 9 is seen a pawl (21) with springrings; viewed radially from the outside.

FIG. 11

Shows another groove in the pawls (21) with less depth which goes through the pawls and on the outside of the ring. The two grooves have a different bottom rake of the pawls, and the last mentioned groove contains a spring ring (21) causing the pawls to engage.

FIG. 12

Shows a wire (19) fastened to a spring-ring (20), which runs through the pawls in a groove (22).

FIG. 13

Sectional view 13—13 is a cross-section through the ring with the two grooves of different depth.

FIG. 16

Shows the same as FIGS. 1 and 5. As in FIG. 5 the width of the crank is made smaller compared to FIG. 1. The pivots (12), corresponding to pivots (11) in FIG. 1, are placed at each end of the groove-opening (14) and have a telescopic function.

FIG. 17

Shows specific details of parts in FIG. 16, respectively the roller-path (24.2) of the pivots (12) and the direction of a sectional drawing viewed 19—19 which can be seen in FIG. 19. Moreover is shown through-sectional view 15—15, which can be seen in FIG. 15.

FIG. 18

Shows specific details of parts in FIG. 16 and FIG. 17 seen from the end. Respectively the roller-path (24.2) of the pivots (12) in the ball-sector (25.2) and, mounted on it, the roller-path (66) for wiredrive (27) for the turn of the ball-sector.

FIG. 19

Shows a sectional view seen 19—19 of FIG. 17, without the ball-sector (25.2). The groove opening (14) for the ingoing shaft to go through can be seen. The part (16.2) protruding from top of the domeshell (10) is seen, and the fastening area (15) of the protruding part (16.2), see FIGS. 15, 20, 21, 22, 23.

FIG. 20

Shows, with dotted line, the positions of the ring (5), when it makes ⅛ and ⅜ of one rotation round. The line (15') indicates a plane, to the right of which the domeshell (10) has a free area which is not overlapped by the ring (5).

FIG. 21

Shows the fastening area (15) of the protruding control-part (16), as well as the domeshell (10).

FIG. 22

Figure 21:
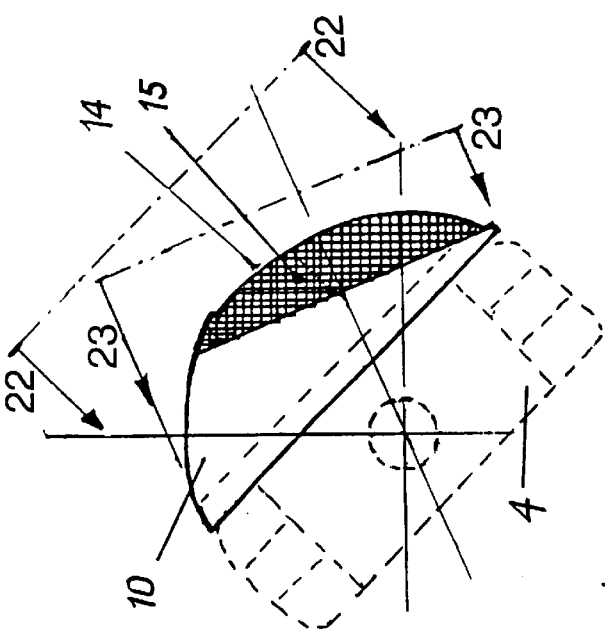
FIG. 21: Shows the non-rotating part, shaped as a domeshell.
Figure 22:
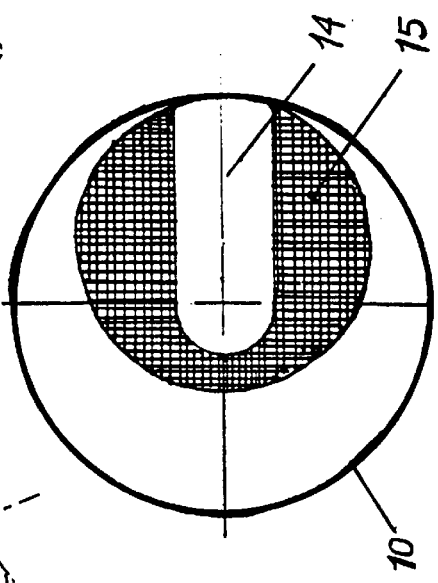
Figure 20:
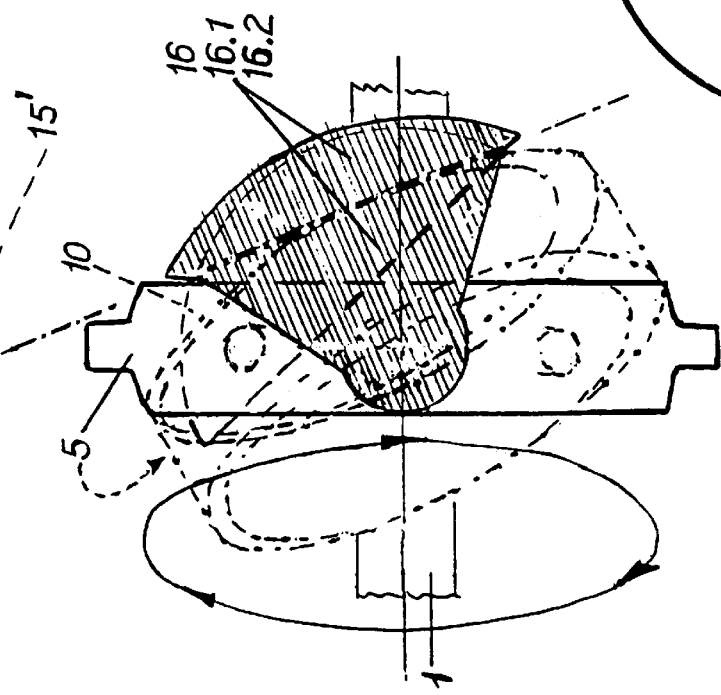
FIG. 20: Shows a plane (15'), to the right of which a controlpart can be fastened to the non-rotating part of the bearing, whose swing/adjustment decides the amplitude of the angular velocity.

Shows a sectional view 22—22 of FIG. 21. The groove opening (14) for the ingoing shaft to go through and the fastening area (15) on the domeshell (10).

FIG. 23

Shows a sectional view 23—23 in FIG. 21.

FIG. 24

Shows the shaft (1) being combined, by pivots (6), with the ring (3), which has pivots (7) at right angles to the pivots (6). The ring (3) is, in order to increase strength, extended to include as much of a spherical shape as the relative motion allows.

FIG. 25

Shows the parts in FIG. 24, seen from the end of the shaft (1).

FIG. 26

Shows the parts in FIG. 24, seen from above. The possible angular change and the shaft (1) compared to the ring (3) is shown with dotted line.

FIG. 27

Shows the parts in FIGS. 24, 25, 26 in perspective.

FIG. 28

Shows a form of construction, where the ingoing shaft (1), which can be a crankshaft, does not go through in the mechanism, so the ringshaped outgoing shaft, in extension, may be connected to a solid outgoing shaft (28).

FIG. 29

Shows a crankshaft (30) being connected with a universal joint, and having its top on a level with the ingoing axis of the pivots in the universal joint. The outgoing joint of the universal joint is at right angles engaging with the outgoing shaft (38) by means of bevel gears (40, 41) suspended turnably (45.1) in a housing (44) around the outgoing shaft.

FIG. 30

Shows an ingoing (37) and an outgoing shaft (38) lying parallel opposite one another, each shaft being jointed (32) and rotating in bearings, mentioned in the claims as outer bearings (40', 45.1) engaging at right angles by bevel gears (40, 41), which are mounted in a housing (44, 45) turnable (45.1) around respectively the ingoing and outgoing shafts, which means an adjustment of a periodically varying angular velocity and a phase displacement of the amplitude can be carried out between the shafts (37, 38)—the phase displacement being carried out by a turning of the bearing housing (45) around the ingoing shaft (37). The intermediate shaft (39), mentioned in the claims as the middle part, can be pushed out to a splineshaft (43). With the advantage of a minimum loss of friction, four engaging bevel gears, placed opposite one another, can be used, as is known from a type of planetary gear.

FIG. 33

Shows a form of construction, where balls (55) are used instead of pivots between the shaft (57) and the outer ring (56). Likewise, there can be balls between the ring (56) and an outer ring on it. On the shaft (57) the two balls (55) are diametrically placed and movable around an axis, at right angles to the shaft (57) in rollerpaths on the plane of the longitudinal direction of the shaft.

FIG. 36

Shows that it is sufficient with only one pivot (12.1) engaging in a roller-path. The domeshell (10) can be partly solid (10.1).

FIG. 31

Shows a partial front view of FIG. 30 of the ingoing shaft (37).

FIG. 32

Shows a partly front view of FIG. 30 of the ingoing shaft 37.

FIG. 34

Figure 33:
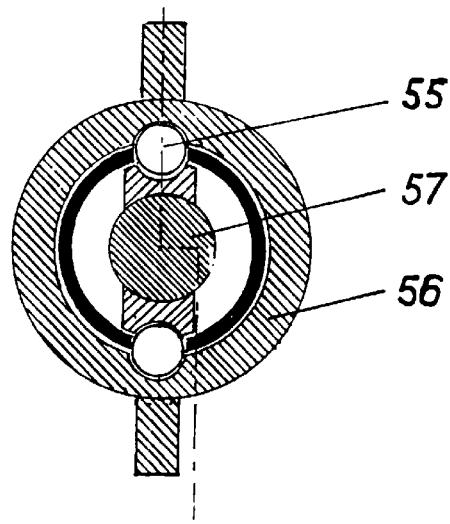
FIGS. 33–34: Shows a form of construction, where balls are used instead of pivots, as the first universal joint.
Figure 34:
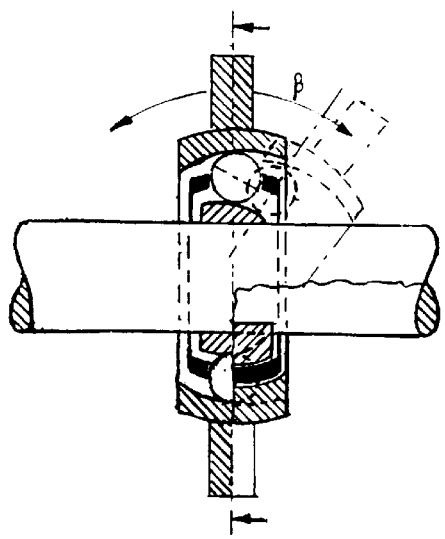
Figure 35:
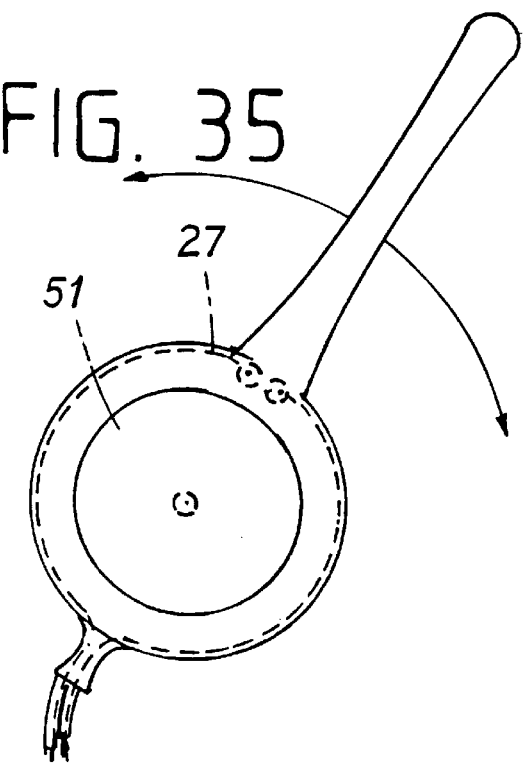
FIG. 35 Shows a manual control-handle to adjust the dimension of the angular velocity-amplitude.
Figure 38:
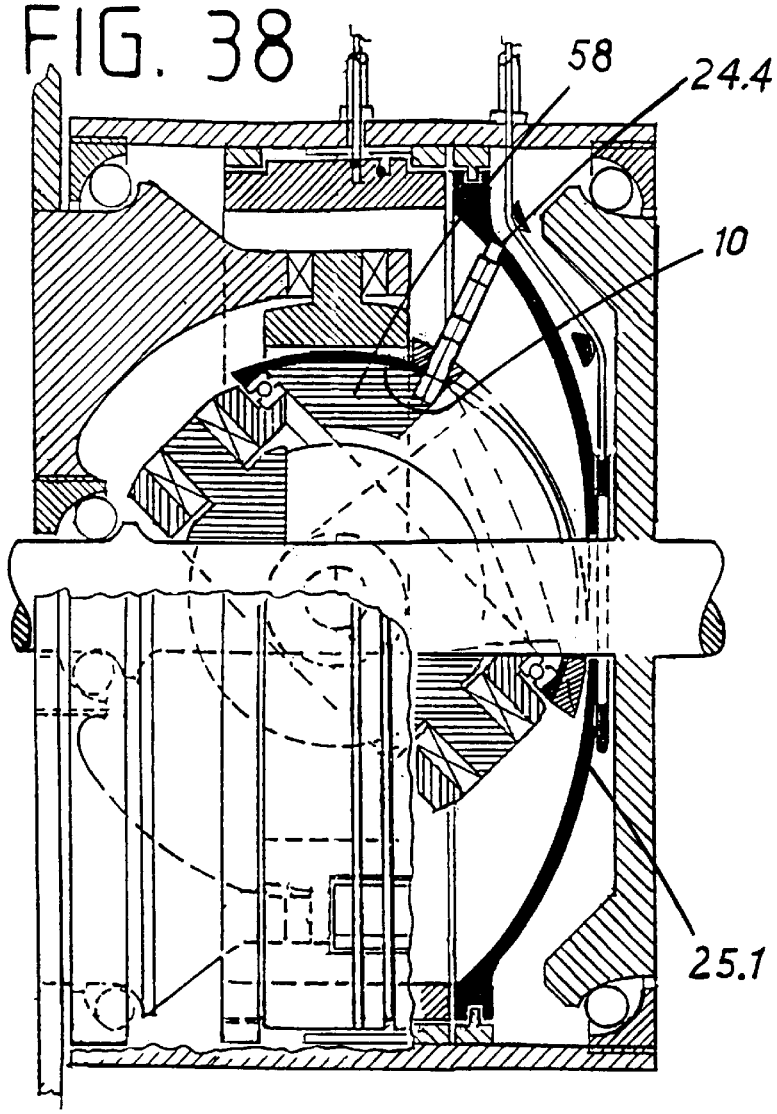
FIGS. 38–39: Shows a different form of steering pivot with variable length, built up by links.

Shows a side view, cross section of the device in FIG. 33.

FIG. 37.A

Shows a manual control-handle to control the turning of the ring (18) and to release the pawls (21) (shown in FIG. 9). The wire (19) is used for both functions. The two ends of the wire are laid, one on each side around a wirewheel in the manual control-handle and fastened (48) to the two ends of a shear-shaped bandspring (46). The activation part (50) of the manual control-handle can be shifted in the longitudinal direction against a spring (49), by which means a roller (47) affects the band-spring (46) so that the wire is pulled/shortened, and the pawls (21) released. Then, by turning the manual control-handle, the two wire ends, where they emerge from the handle, are displaced in each their direction, so that the ring (18) is turned.

FIG. 37

Shows a front view of the handle in FIG. 37.A.

FIG. 35

Shows a manual control-handle with a wirewheel with frictional resistance (51) for maneuvering the wire, that controls the turning of the ball-sector and with that, the swing of the domeshell and the adjustment of the angular velocity-amplitude.

FIG. 39

Shows a pivot (12.2) consisting of links, of which two have a toothed rim-engagement (59). The length of the pivot is changed by the movements of the links.

FIG. 41

Shows a retaining of the outer ring (18) by means of a pivot, engaging into holes in the ring. The pivots can be released by a wire (60). As long as the ring (18) is not retained, it may be turned by moving along during pedal activation.

FIG. 40

Shows that the ball-sector, instead of being retained/kept from rotating by wireconnection, may be retained by a springloaded pivot (54).

FIG. 42

Shows a basic design of the main elements of the mechanism.

FIG. 38

Figure 39:
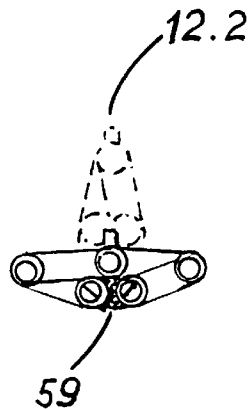
Figure 40:
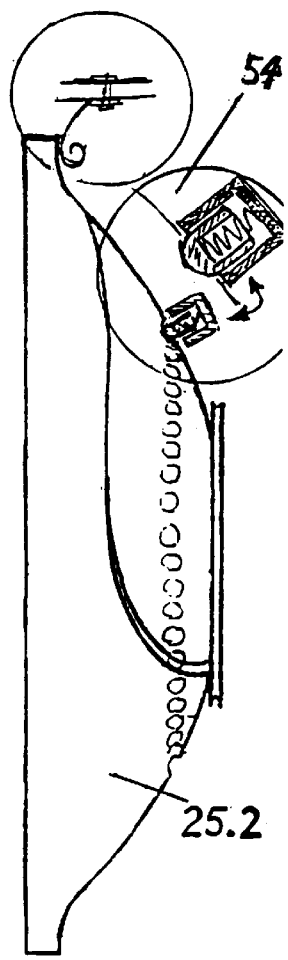
FIG. 40 Shows that a springloaded pivot may retain the domeshell, the turning of which takes place by means of the manual control-handle, of FIG. 35.
Figure 41:
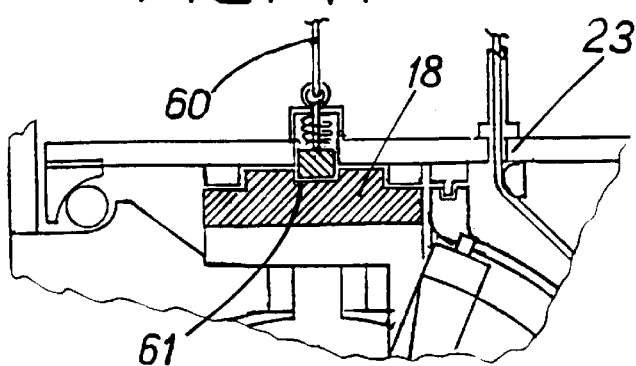
FIG. 41 Shows a retaining of the outer ring, which can be turned by the manual control-handle of FIG. 37.
Figure 42:
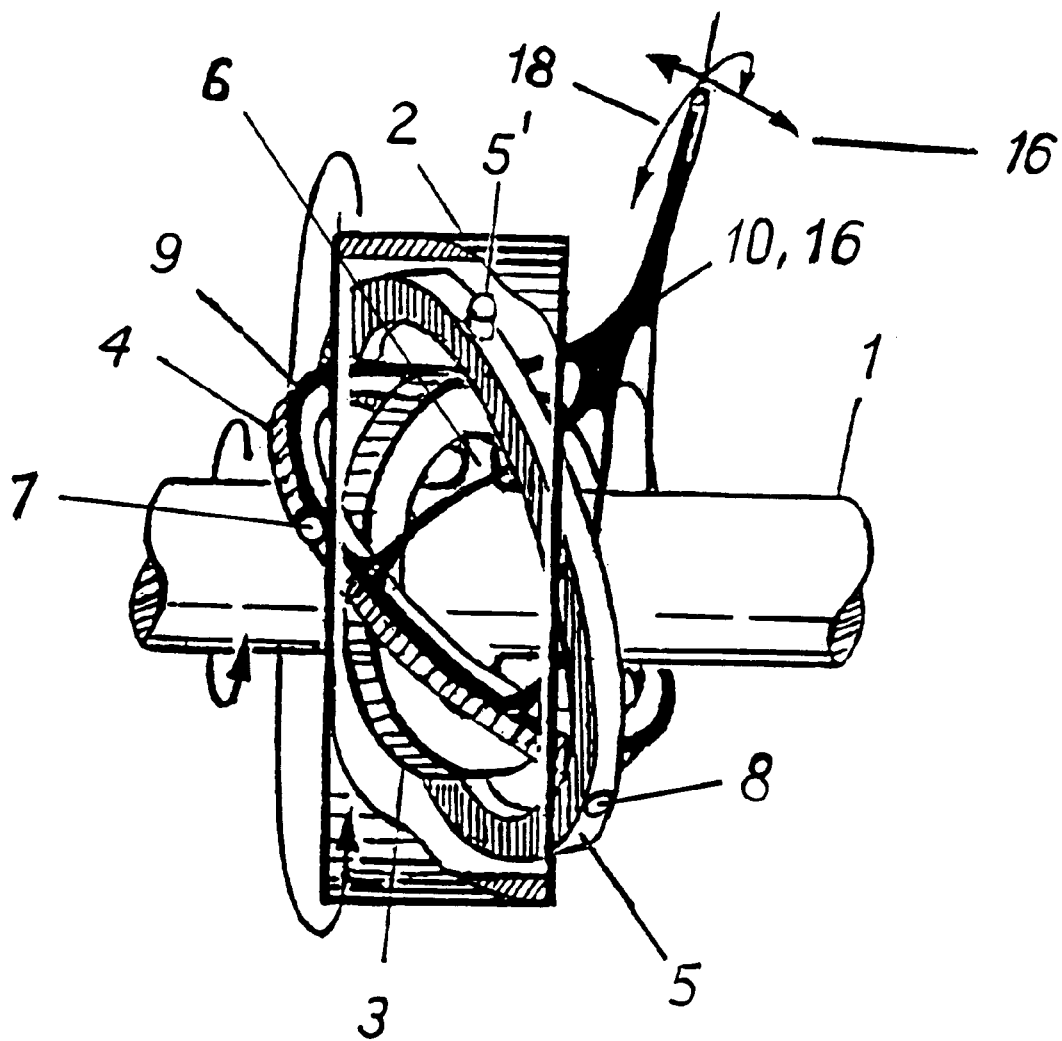
FIG. 42: Shows a basic design of the main elements.

Shows a pivot as in FIG. 39 in engagement with roller-paths (24.4) in the ball sector (25.1) and the dome shell (10).

What is claimed is:

1. A mechanism having an ingoing and an outgoing shaft to transform a rotation with constant angular velocity to a rotation with periodically varying angular velocity, comprising two heterokinetic universal joints connected up in series and an adjustable middle part which is an output element of the one universal joint and an input element of the other universal joint, the axis of said middle part is arranged so as to swing to an angular position compared to the ingoing and the outgoing shaft, so that the periodical angular velocity of one of these shafts is adjustable between a maximum amplitude and a zero amplitude whereby said middle part has radially directed pivots or bearings for pivots which are part of the second and the first universal joint, said middle part is the rotating part of an outer bearing whose non-rotating part is suspended swingably in bearings in order that the adjustment can be carried out, actuating means are provided by means of which the axes of said pivots or bearings for pivots for the second universal joint and the axes for pivots or bearings for pivots for the first universal joint are orientated at an angle of up to and including 90° from one another, said outgoing shaft is connected with said second universal joint by connecting means wherein said outgoing shaft does not go through the said middle part.

2. A mechanism according to claim 1, wherein said outgoing shaft is surrounding said middle part by said connecting means provided by said means of which the ingoing shaft goes through the middle part, said ingoing shaft carries radially directed pivots and said connecting means comprises said radially directed pivots of said ingoing shaft combined with a surrounding ring, said surrounding ring carries said radially directed pivots which in turn are combined with said adjustable middle part being said means in the form of a surrounding ringshaped middle part as the pivots of said ingoing shaft and said bearings for pivots for the first universal joint are directed at right angles to one another and are part of the first universal joint, said adjustable middle part is combined via said radially directed pivots with an additional surrounding ring and said connecting means further includes said additional surrounding ring is combined via radially directed pivots with an outer cylindrical ring being said outgoing shaft whereby said pivots for said additional surrounding ring and said pivots for said outer cylindrical ring are directed, at right angles to one another, and are part of the second universal joint.

3. A mechanism according to claim 2, wherein said non-rotating part of said outer bearing is suspended swingably via said bearings (17), furthermore is suspended swingably around the axis of the ingoing shaft and around the outgoing shaft on an outer ring which is concentric to the ingoing shaft and stretches out round the outgoing shaft and said non-rotating part; said outer ring can be turned via said actuating means being in the form of a wire-drive so that a phaseshift of the amplitude can be adjusted, and said outer ring is retained by means of pawls engaging in grooves provided in a surrounding cylindrical crank-housing.

4. A mechanism according to claim 3, wherein said non-rotating part of the outer bearing includes a dome-shell with a free area which is not overlapped by said additional surrounding ring, which free area is a fastening area for a protruding part of the non-rotating part so constituting said actuating means, and comprising a groove-opening.

5. A mechanism according to claim 4, wherein said non-rotating part of the outer bearing includes a protruding part supplied with one or more radially directed pivots placed in the centre plan of said groove-opening or next thereto in engagement with a roller-path provided in a ball-sector which is concentric with the ingoing shaft and turnable therearound by means of a wire in a controlled manner and which stretches out round said non-rotating part.

6. A mechanism according to claim 2, wherein said outer cylindrical ring being the outgoing shaft extends to a solid end forming the outgoing shaft opposite to the ingoing shaft, the end of which is accomodated in the outgoing shaft.

7. A mechanism according to claim 2, wherein said first surrounding ring is enlarged to a spherical shape in order to obtain an increase of strength.

8. A mechanism according to claim 2, wherein said pivots and bearings of said first universal joint are replaced by balls in roller-paths, wherein the improvement comprises:

two diametrically placed balls in a first set roller-paths transversely to the centre-plane of said adjustable middle part and 90° displaced on said middle part from said pivots, which are part of the first universal joint, said ingoing shaft is combined with a surrounding ring via two diametrically placed balls in said first set roller-paths transversely to the centre-plane of said surrounding ring, whereby on the ingoing shaft said balls can move in the longitudinal direction of the ingoing shaft, said surrounding ring is combined with said adjustable middle part via two diametrically placed balls in a second set roller-paths transversely to the centre-plane of said adjustable middle part, whereby said first—and second sets of roller-paths are 90° displaced on said surrounding ring from one another and are part of the first universal joint.

9. A mechanism according to claim 1, to be used with a cardanshaft drive, wherein the said ingoing and outgoing shaft lie parallel to one another, said connecting means comprises:

each shaft is connected via right angled bevel gears to the universal joint said bevel gears are suspended in outer bearings whose non-rotating part of said outer bearing is suspended in a turnable bearing-housing respectively around the ingoing and the outgoing shaft, so that an adjustment of periodically varying angular velocity and a phase displacement of the amplitude can be carried out between the ingoing and outgoing shaft whereby the phase displacement is carried out by turning said bearing-housing around the ingoing shaft and whereby the said middle part being said means in the form of a spline-shaft.

10. A mechanism according to claim 9, in which the pivots for the universal joints are replaced by balls in roller-paths, said ingoing and outgoing shaft lie parallel to one another, each shaft is connected via said right angled bevel gears with the outgoing joint of the universal joint, wherein the improvement comprises:

said outgoing joint has two diametrically placed balls in roller-paths arranged in the longitudinal direction of said outgoing joint and combined with a surrounding ring via roller-paths transversely to the centre-plane of said surrounding ring, said surrounding ring carries radially directed pivots which are part of the universal joint.

11. A mechanism according to claim 1, wherein the ingoing shaft is a crank-shaft.

\* \* \* \* \*